W. S. OVERLIN.
MECHANICAL CASHIER.
APPLICATION FILED NOV. 5, 1912.

1,218,455.

Patented Mar. 6, 1917.
6 SHEETS—SHEET 1.

Fig. 1.

WITNESSES
E. H. Wagner
G. W. Kirkly

INVENTOR
William S. Overlin
BY
J. H. Robb
ATTORNEY

W. S. OVERLIN.
MECHANICAL CASHIER.
APPLICATION FILED NOV. 5, 1912.

1,218,455.

Patented Mar. 6, 1917.
6 SHEETS—SHEET 3.

WITNESSES
E. H. Wagner.
G. W. Kirkley

INVENTOR
William S. Overlin
BY 
ATTORNEY

W. S. OVERLIN.
MECHANICAL CASHIER.
APPLICATION FILED NOV. 5, 1912.

1,218,455.

Patented Mar. 6, 1917.
6 SHEETS—SHEET 5.

WITNESSES
C. H. Wagner.
G. W. Kirkley

INVENTOR
William S. Overlin
BY
J. J. Probst
ATTORNEY

Fig. 11.

UNITED STATES PATENT OFFICE.

WILLIAM S. OVERLIN, OF PORTLAND, OREGON, ASSIGNOR, BY MESNE ASSIGNMENTS, TO INTERNATIONAL MONEY MACHINE COMPANY, OF TERRE HAUTE, INDIANA, A CORPORATION OF INDIANA.

MECHANICAL CASHIER.

1,218,455.  Specification of Letters Patent.  Patented Mar. 6, 1917.

Application filed November 5, 1912. Serial No. 729,704.

*To all whom it may concern:*

Be it known that I, WILLIAM S. OVERLIN, a citizen of the United States, residing at Portland, in the county of Multnomah and State of Oregon, have invented certain new and useful Improvements in Mechanical Cashiers, of which the following is a specification.

This invention appertains to the art of handling money by mechanical means, and involves primarily certain improvements in machines whereby money is delivered in predetermined amounts, and also to those machines commonly known as change makers, strictly speaking.

So far as I am aware, there has always been a limitation heretofore upon the most advantageous operation of machines of the class referred to because they are incapable of receiving and handling paper currency, or bills, in the condition in which the latter are supplied to banks, factories, commercial houses et cetera, namely, in flat piles or packs containing a predetermined number of bills of a certain denomination.

Those machines with which I am familiar, and by which paper currency may be delivered, necessitate a preliminary handling of the money, as for instance the crumpling of a bill into a small receptacle shaped like a coin, said bill being ejected from the machine practically as if it were a coin. After delivery of the bill it must be removed from the receptacle, and obviously the operations incidental to preparing the currency for use in the machine, and finally arranging it in condition to pocket or classify, are time consuming and impracticable for commercial purposes.

By my present invention I have solved the problem of devising a machine in the operation of which individual bills, or pieces of paper currency, may be selectively delivered in predetermined amounts from piles or stacks, just as easily and expeditiously as has already been accomplished in relation to coins or metal currency. Furthermore, the element of safeguarding against liability of inaccuracy has been borne in mind, the bill handling mechanism of the present invention insuring the delivery of single bills only from a certain holder, a precautionary phase of operation avoiding absolutely the likelihood of misplacement.

This invention also affords a machine which is adapted to deliver paper currency and coinage simultaneously, as well as to interchangeably eject or discharge money of either of the forms suggested, and of the same denomination, all of which is not only desirable but practically a necessity in a machine of maximum efficiency.

In carrying out the invention, pneumatic means are utilized to handle the paper currency, along with suitable ejecting mechanism by which the coins or metal currency are discharged. The pneumatic means aforesaid is especially employed because paper money is very light and requires a particularly sensitive mechanism in order to separate one bill from a stack or pile and deliver the same to a suitable point of deposit without disturbing the remaining bills of the pile. Manipulative devices such as keys are employed as a part of the selector mechanism of the machine, said devices being operated according to the amount to be delivered and setting the selecting means ready to discharge one or more pieces of money, either in the form of paper or metal currency or both, after which the selective ejectors or discharging devices are operated to deliver the money from the machine.

The coin delivery machine illustrated in the drawings is of the type described in the application for patent of Thomas Bilyeu, William S. Overlin and Fay A. Gridley filed April 14th, 1910, Serial Number 555,552, the mechanism for handling paper currency being applied to said machine for combinative operation with the parts of the latter. A denotes the keyboard of the machine which comprises a bank of keys 1 arranged in rows and the keys of each row being numbered from 1 to 9 according to the decimal system of coinage. There are provided auxiliary keys 1ª used for purposes of making change solely but the operation of the latter will not be described because immaterial to the present invention. As in the application hereinbefore referred to, the keys 1 are adapted to operate selector bars 2, each of which is capable of actuating a selector bail or yoke 3, the parts 2 and 3 being arranged in the casing of the machine at the lower portion of the latter and beneath the coin receptacles 4. Suitable coin-ejectors 5 are provided, one for each receptacle 4, and interlock with the members 3, by a projection 3ª. Depression of one of the keys 1, through its selector bar 2, will actuate one or more selected bails or yokes 3 and shift the coin ejectors 5 connected with said bails into an operative position in relation to the ejector arms 6 of the ejector shaft 7. A subsequent movement of the ejector shaft 7 by the operating handle 8 of the machine will impart ejecting movement to those of the ejectors 5 which have been thrown into operative positions, all in a manner fully explained in the previous application above identified.

The casing B of the machine may be said to be divided into superposed compartments by the horizontal partitions 9 and 10, and the top casing plate 11 of the machine. The several ejectors for the coins in the receptacles 4 are mounted to slide on the partition 10 and the bails or yokes 3 are arranged in the compartment intermediate the partitions 9 and 10.

To adapt the machine for the delivery of paper currency the top plate 11 of the casing B is divided into a plurality of holders by a suitable arrangement of upwardly projecting pins 12 arranged in series, each series holding in proper position on the casing a stack or pile of bills designated at 13. The pneumatic delivery means employed to deliver or eject the bills 13 from the several holders comprises a plurality of suction devices, one for each holder containing bills. Each suction device consists of the suction head or nozzle 14 having a trunnion 15 which is pivotally mounted in the upper end of a lifting bar 16, the lower end of said bar 16 being pivotally connected with an angle lever 17 loosely mounted on a shaft 19 near the rear of the machine and extending longitudinally in the compartment intermediate the partition 10 and the top plate 11 of the casing. The shaft 19 carries as many of the levers 17 as there are suction delivery devices. A chain 20 and spring 21 connect the trunnion 15 of each suction device with the partition 10 of the casing and a torsion spring 22 forms a part of the connection between the parts 16 and 17. Above the shaft 19 is a main suction conduit 23 extending longitudinally almost the entire length of the machine and connected with a vertical suction pipe 24 located adjacent to that end of the machine opposite the keyboard A. A horizontal branch 24ª of the pipe 24 leads from the machine to a suitable exhaust fan or other suction device, not shown, and by which a normal suction is created through the pipes 24ª, 24 and the suction conduit 23. A cut-off valve 25 is arranged in the length of the branch pipe 24ª, being pivoted at 25ª to a supporting bracket 26 arranged vertically between the base of the machine and the partition 9. The operation of this cut-off valve will be explained more fully hereinafter. Leading from the suction conduit 23 are flexible suction pipes 27, one of which is provided for each suction device comprising the head or nozzle 14. This flexible pipe 27 may be made of rubber tubing or the like and the end opposite that connected with the conduit 23 is attached to a goose neck 28 carried by the lifting bar 16. Suction created in the conduit 23 will also be created through the flexible pipes 27, the hollow goose necks 28, the hollow portions of the lifting bars 16, the hollow trunnions 15 and the suction nozzles or heads 14 which are also hollow and bifurcated to provide spaced suction members 14ª engaging the uppermost bills in the holders, near the opposite ends of said bills.

Figure 3:
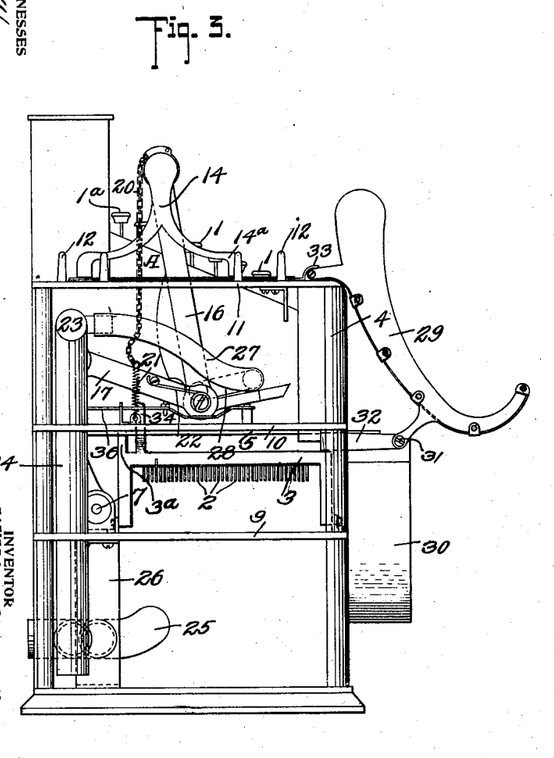
Fig. 3 is an end view of the machine, the end casing plate being removed to bring out the arrangement of interior parts.
Figures 6, 7:
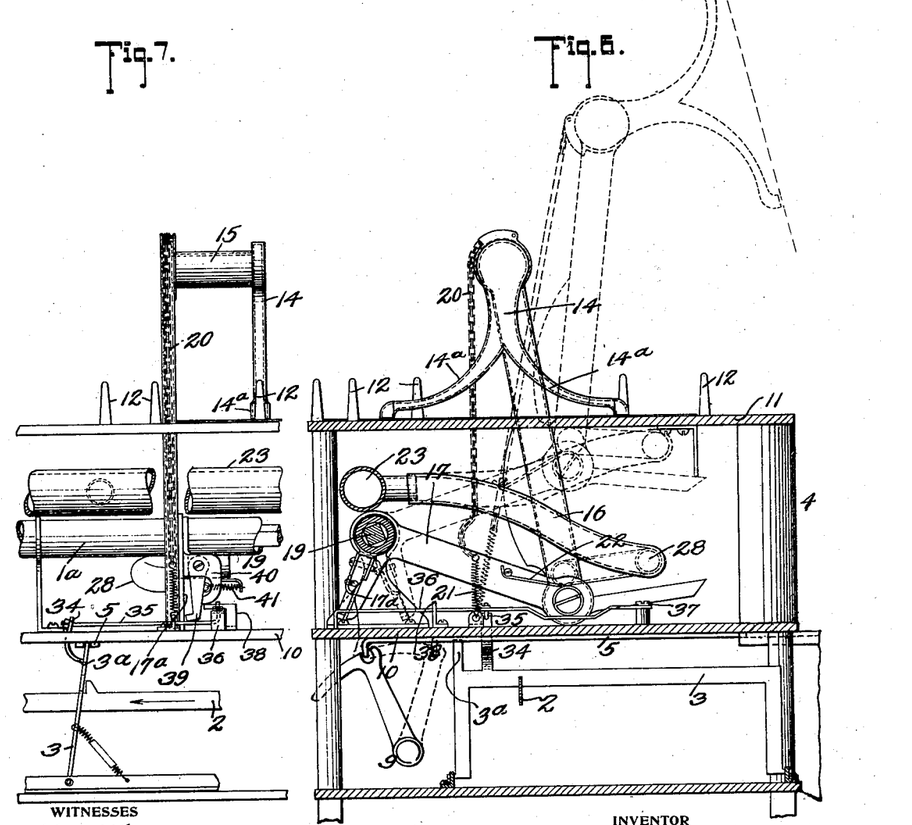
Fig. 6 is a sectional view transversely of the machine bringing out clearly certain parts of the selector mechanism, and the penumatic delivery devices.
Fig. 7 is a fragmentary rear view of the majority of parts illustrated in Fig. 6.
Figure 8:
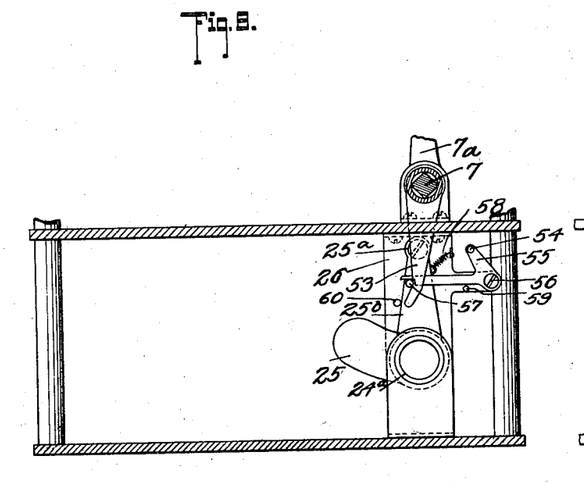
Fig. 8 is a detail sectional view of the suction cut-off valve and means controlling its operation.
Figure 9:
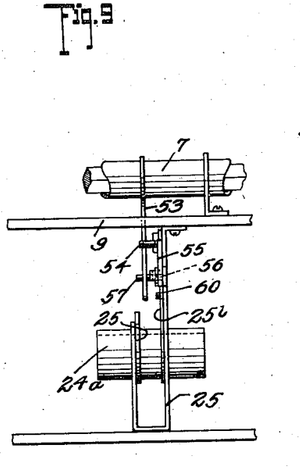
Fig. 9 is a rear view of the same.
Figures 10, 12:
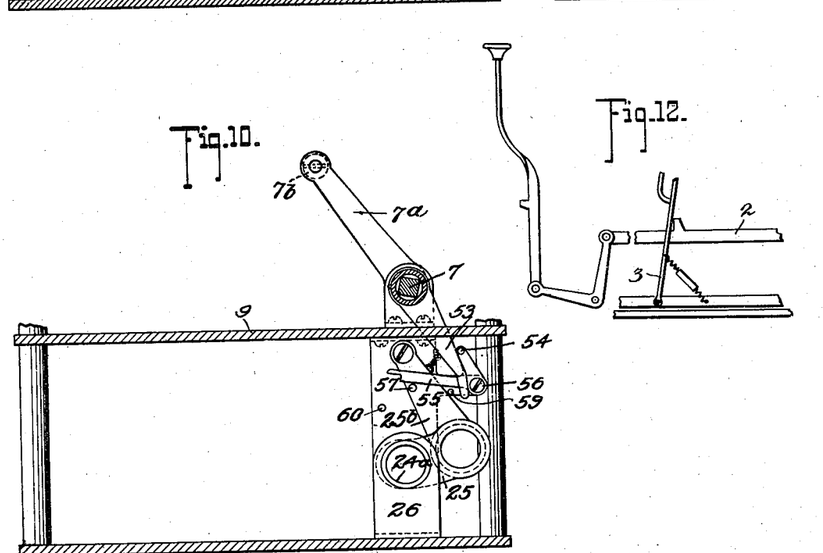
Fig. 10 is a view similar to Fig. 8 but showing the valve in the position assumed thereby after it has been operated.
Fig. 12 is a view showing the connection between the selector bars and keys.

Having in view the foregoing, it will be apparent that if any one or more of the levers 17 should be actuated into the dotted line position shown in Fig. 6, the lifting bar or bars 16 and nozzles 14 will be correspondingly elevated. Suction through the suction heads 14 will be nicely regulated so that as said heads are lifted with the bars 16 the uppermost bills engaged by the heads will be raised. During the upward movement of the heads 14, through the connections 20, a pivotal movement is imparted to each head to cause the latter to swing upwardly and outwardly to deliver the bill engaged thereby from the holder to a point above the bill delivery chute 29. The chute 29 is arranged at the front of the machine above the coin delivery chute 30, said chute 29 being pivotally supported at its lower end, as shown at 31, upon brackets 32, a longitudinal rod at the upper rear portion of the chute 29 being engaged by a spring catch 33 to hold the chute in its normal position as shown in Fig. 3. The chute 29 is preferably made of transparent celluloid, or the like.

It has been described hereinbefore that the selector bails or yokes 3 are operable by the selector bars 2 to render connected ejectors 5 operative to eject coins. Not only are certain of the bails 3 connected with an ejector but such certain bails are formed with a vertical extension 34 projecting through a slot in the partition 10 of the casing and connected with a longitudinal shifting rod 35. The rod 35 in turn is connected with a lever 36 pivoted at 37 above and to the partition 10 for horizontal movement guided by a bracket 38. The free end of the lever 36 is adapted to engage with a pivoted tripping arm 39 carried by a bracket 40 which is rigidly mounted on the shaft 19. Thus by depressing a key, as will be later described, the lever 36 may be moved laterally at its free end to engage and carry the arm 39 to the left as seen in Fig. 7, thereby engaging the lower end of said arm 39 behind the arm 17$^a$ of the angle lever 17. For the purposes of this description the shaft 19 will be styled an auxiliary ejecting shaft because to a certain extent it performs a function with respect to the bill delivering mechanism corresponding with the function of the ejector shaft 7 of the coin ejecting mechanism. When the tripping arm 39 is actuated by the lever 36 it is forced into operative engagement with the short arm 17$^a$ of the angle lever 17 so that should the shaft 19 be actuated, the lever 17 which is normally loose on the shaft, now engaged by the arm 39, will be correspondingly moved with said arm which is oscillated slightly during the said operation of the shaft 19. The tripping arm 39 is normally held out of engagement with the arm 17$^a$ by a coil spring 41 connecting said arm in the bracket 40.

Figure 1:
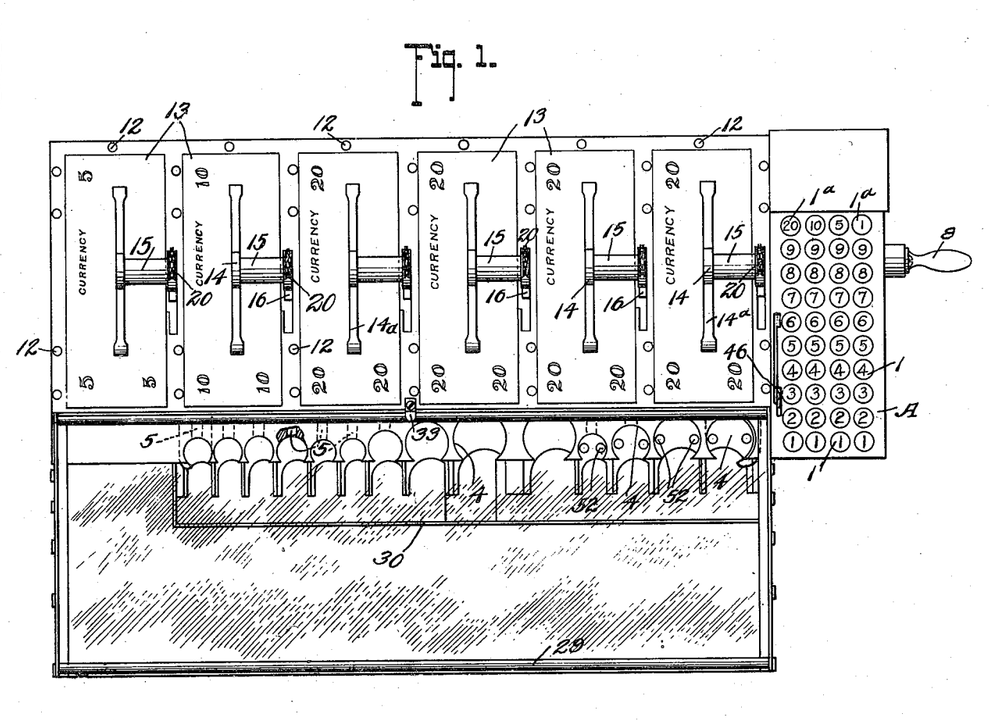
Figure 1 is a top plan view of a machine embodying the essential features of the invention.
Figure 2:
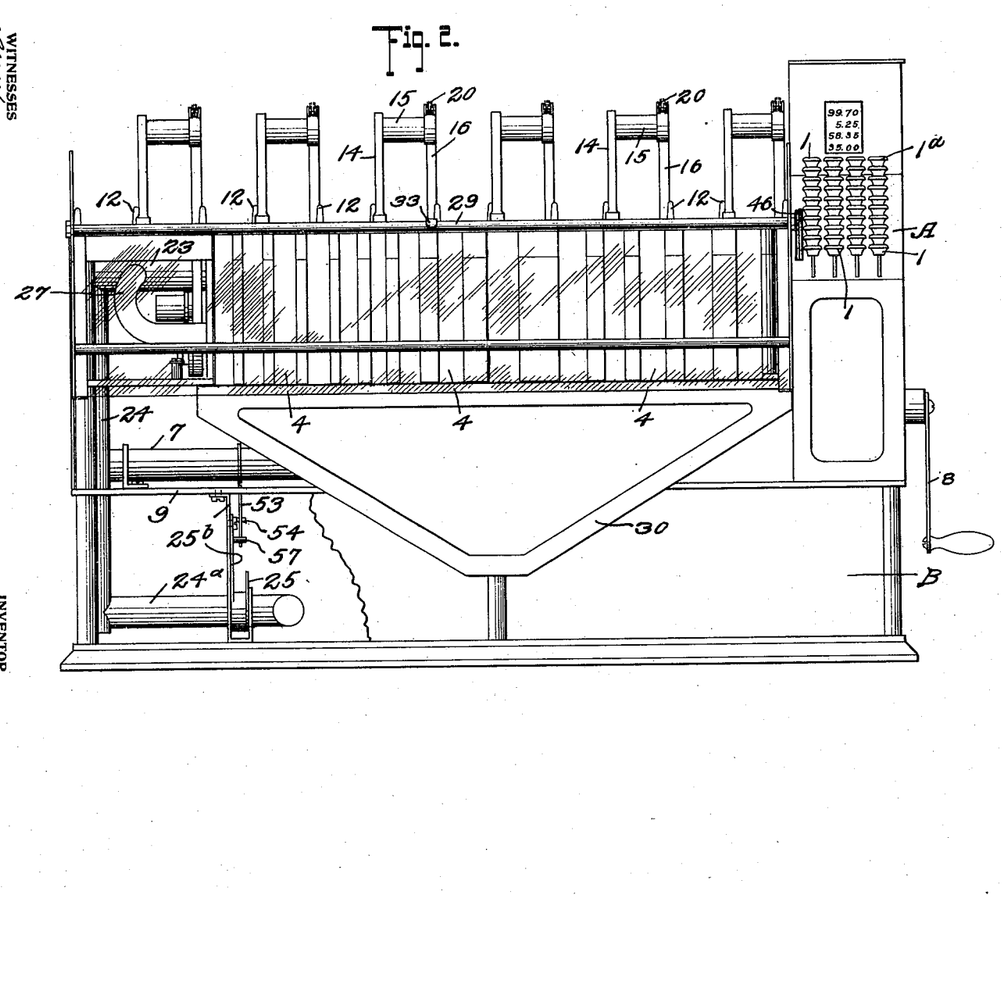
Fig. 2 is a front elevation of the machine, the front of the casing being partly broken away to show certain valve mechanism by which the suction through the suction conduit of the pneumatic delivery means, is cut off at a predetermined time.
Figure 4:
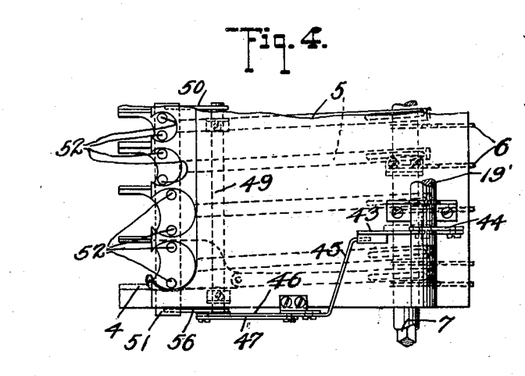
Fig. 4 is a fragmentary plan view of the coin lifter and means controlling its operation.
Figure 5:
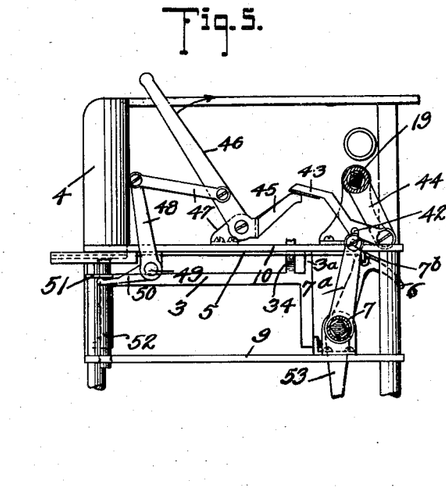
Fig. 5 is a fragmentary end view of the parts shown in Fig. 4.

The auxiliary ejector shaft 19 is designed to be operated by the main ejector shaft 7 but is normally disconnected from said shaft 7. As shown in Figs. 4 and 5 the shaft 7 carries an arm 7$^a$ rigid therewith and having a pin 7$^b$ adapted to engage in a notch 42 of a lever 43 which is pivotally connected at one end with an arm 44 on the shaft 19. The forward end of the lever 43 engages loosely with the short arm 45 of a controlling lever 46 pivoted upon the upper side of the partition 10. The lever 46 is connected by a link 47 with an arm 48 on a short shaft 49 which is mounted in suitable bearing brackets on the under side of the partition 10. The shaft 49 is a rock shaft carrying the rocker arms 50, the latter extending at their free ends beneath a plate 51 which is of sufficient length to extend longitudinally of the machine beneath the coin receptacles 4 which are designed to contain gold coins or those ranging in value from five dollars up to twenty dollars. The plate 51 is connected with a plurality of coin lifters in the form of short vertical rods 52, the upper ends of which pass through openings in the base portions of the coin receptacles just referred to, and the lower ends of which pass through openings in the partition 9. A pair of the lifters 52 coacts with each of the receptacles 4 for the gold coins and are spaced apart a sufficient distance to permit the ejectors to slide longitudinally therebetween, see Fig. 1.

An understanding of the operation of the mechanism described, and shown most clearly in Figs. 4 to 6 inclusive, will be readily obtained upon reference to a transaction of the machine. Before describing such transaction it may be observed that while the machine of this invention as herewith illustrated is provided with holders for bills ranging in denominations from five to twenty dollars, an additional holder or holders to contain one dollar bills might be provided. When the parts of the machine are at normal the money ejecting mechanism is designed to deliver currency in coinage, the controlling parts being in substantially the position shown in Figs. 4 and 5. Should the operator desire, however, to deliver a twenty dollar bill instead of a twenty dollar gold eagle he will pull the controlling lever 46 rearwardly, see Fig. 5, this action raising the coin lifters 52 which correspondingly elevate a slight distance the several stacks of coins in the four receptacles which hold gold coinage. The elevation of the coins in the receptacles 4 just mentioned prevents any of said coins from being ejected when any one of the selected ejectors cooperating with the receptacles for the gold currency is operated subsequently on turning the handle 8 of the machine. The movement of the controlling lever 46, as above set forth, lowers the arm 45 of said lever and permits the lever 43 to drop slightly until its notch 42 is engaged with the pin 7$^b$ of the arm 7$^a$ while previously the ejector shaft 7 was disconnected from the shaft 19. The lowering of the lever 43 operatively connects the arm 7ª of shaft 7 with the arm 44 of shaft 19 and the machine has now been adjusted so that if any one of the keys 1 controlling the delivery of bills or paper currency from the machine, is depressed, paper currency instead of metal currency will be discharged on the subsequent operation of the main actuator or handle 8. Supposing now that it is desired to deliver a twenty dollar bill from the machine, the key 1, designated "2", of the fourth row from the outside of the keyboard A will be depressed and this operation will move the selector bar 2 of said key, tilting the yoke or bail 3 which is connected to the ejector 5 of one of the twenty dollar gold piece receptacles 4. The movement of the bail 3 actuates the lever 36 and tripping arm 39 of the pneumatic or suction device coöperating with one of the bill holders containing twenty dollar bills, said arm 39 being operatively engaged with the actuating arm 17ª of the lever 17 of such suction device. If the handle 8 is now operated, during one half of the revolution of said handle the arm 7ª of the ejector shaft 7 will move forwardly, see Fig. 5, causing a rocking movement to be imparted to the shaft 19 on which the various levers 17 are mounted. One of the levers 17 only, however, has been operatively connected with the shaft 19 so that the rocking of the shaft 19 imparts a rocking movement to the lever 17 just mentioned and the bar 16 and suction head 14 will be correspondingly actuated. The uppermost bill in one of the twenty dollar bill holders is carried upward with the suction head 14 which is operated in the manner just described.

As the bill separated from those in a certain holder is raised and swung outwardly above the chute 29 the suction through the parts 27, 28, 16 and 14 is automatically cut off, permitting the bill to drop freely from the head 14 into the chute 29. The means for cutting off the suction for the purpose mentioned is shown in Figs. 1 and 8 to 10 inclusive and comprises an arm 53 rigidly mounted upon the main ejector shaft 7 and depending therefrom through a slot in the partition 9 of the casing. This arm 53, during the first half revolution of the handle 8, moves rearwardly in the casing and when a suction head or heads 14 have been operated to assume their uppermost positions, the arm 53 strikes a pin 54 on a latch lever 55 pivoted to the bracket 26 at 56. The lever 55 is moved upwardly by the engagement of the arm 53 and is disengaged from a pin 57 on the valve hanger 25ᵇ, thereby permitting a spring 58 connected to the valve to force the valve rearwardly into closed position. The swinging movement of the valve 25 is limited by pins 59 and 60. The moment the valve 25 reaches a closed position in respect to the pipe branch 24ª the suction through the conduit 23 and various suction heads is cut off and the suction head or heads operated will drop the bills into the delivery chute 29 simultaneously with the cutting off of the suction in the manner set forth. During the last half revolution of the handle or actuator 8 the arm 53 returns to its normal position and by engaging the pin 57 moves the valve 25 forward until the latch lever 55 is engaged again with the pin 57 whereupon the valve will be locked in its open position, reëstablishing a suction through the conduit 23 and several suction heads or devices connected therewith. The normalizing movement of the handle 8, which is really the last half of its revolution, restores the ejectors 5, bails 3, selector bars 2, and other parts to their normal positions by movement reverse to the movement setting the ejectors in their operative positions, all in a manner substantially like that presented in the previous application hereinbefore referred to.

It will be apparent from the foregoing that by simply moving the controlling lever 46 the machine will be set for the delivery of either bills or coins, in respect to certain denominations of money ranging in the present instance from five dollars to twenty dollars. The delivery of coins in denominations lower than five dollars will be undisturbed, of course, by any operation of the controlling lever 46. Under these conditions, the lever 46 and its connected parts constitute virtually a means whereby the delivery of bills or coinage from the machine may be interchangeably controlled. Since the keys 1 are not only adapted to select gold coinage or the paper currency for delivery but control the discharge of coins of smaller denomination, it is quite evident that the operator of the machine can at will discharge bills or paper currency alone, coinage alone, or both paper currency and coinage, in predetermined amounts. Thus if the amount to be delivered is fifty-five dollars and fifty-five cents, the operator will depress the corresponding keys 1 of the keyboard A if the lever 46 is in its normal position, and on operation of the handle 8, two gold eagles, a ten dollar gold piece, a five dollar gold piece and fifty-five cents in silver will be ejected. If the lever 46, however, is moved rearwardly, previous to turning the handle 8, the amount above mentioned will be delivered in the form of two twenty dollar bills, a ten dollar bill and a five dollar bill, selected from four different bill holders of the machine, and fifty-five cents in silver.

The peculiar movement of the bill discharging device is of importance, it being necessary to raise the uppermost bill a short distance above the remaining bills in a holder, before swinging said bill outwardly to deliver the same from the machine. Were the uppermost bill gripped by the suction device and immediately swung to the point of delivery, there would be a tendency to draw with it other bills in the holder, and the proper operation of the machine would be interfered with.

It is contemplated within the purview of this invention to accomplish the delivery of bills in various ways equivalent to the delivery principle hereinbefore described as preferably used. Evidently a relative movement only of the bill holders and their ejectors or delivery devices, is necessary.

Figure 11:
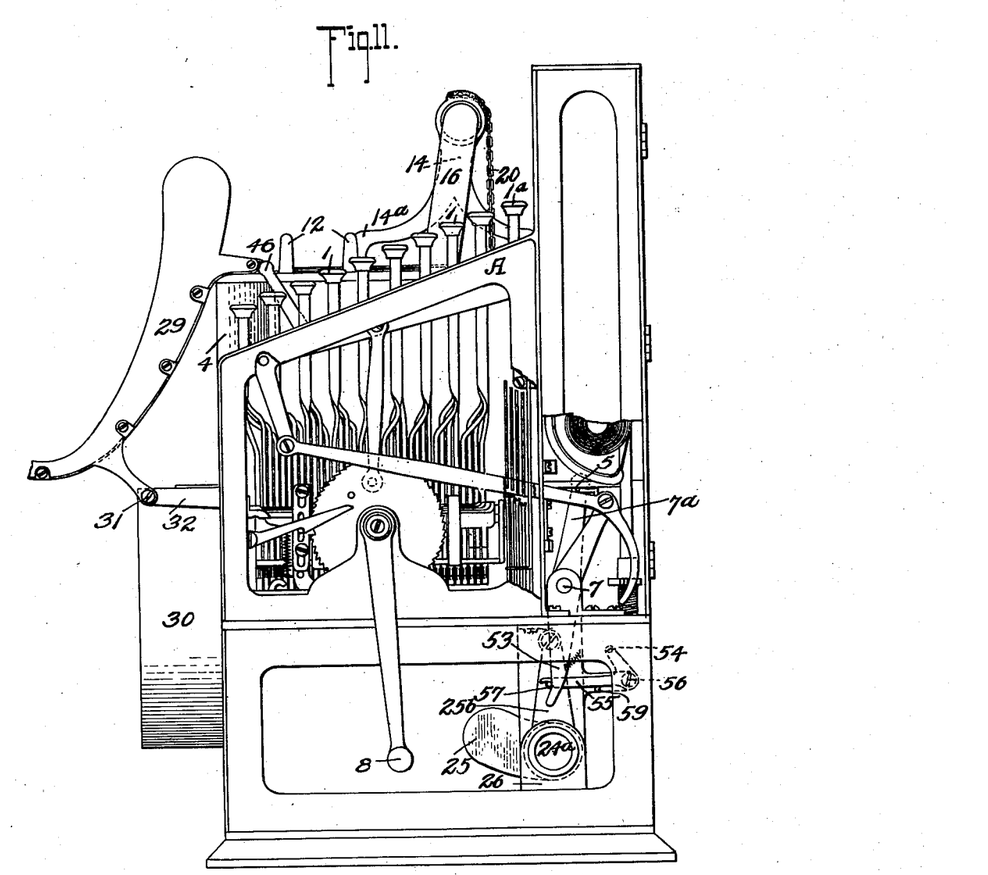
Fig. 11 is a view partly broken away to show certain internal mechanism, and looking toward the handle end of the machine.

Certain parts shown in Fig. 11 of the drawings, such as the full stroke compelling disk, and associated key locking and releasing mechanism have been fully described in the copending application previously referred to, and since they do not form a part of the present invention no details thereof are herein set forth.

Having thus described the invention, what is claimed is:

1. In a money handling machine, the combination of holders for bills of paper currency, a plurality of suction devices for removing the bills from said holders, and manual means to individually and collectively operate said devices.

2. In a money handling machine, the combination of a plurality of bill holders, a plurality of suction devices associated therewith and adapted to carry bills from said holders to a suitable point of delivery, and manual means to separately and simultaneously operate said devices.

3. In a money handling machine, the combination of a plurality of bill holders, a plurality of suction devices associated therewith and adapted to carry bills from said holders to a suitable point of delivery, selector mechanism for selecting a predetermined one of the suction devices for operation, and means for operating a selected suction device.

4. In a money handling machine, the combination of a plurality of bill holders, a plurality of suction devices associated therewith and adapted to carry bills from said holders to a suitable point of delivery, selector mechanism for selecting a predetermined one of the suction devices for operation, and means for individually or collectively actuating selected suction devices.

5. In a money handling machine, the combination of a bill holder, a movable suction device associated therewith to deliver a bill from the holder to a suitable point of deposit, manipulative means to initially render said suction device operative, and means to subsequently actuate the same.

6. In a money handling machine, the combination of a plurality of bill holders, suction devices associated therewith and each comprising a suction head movable toward and from the holder, manual means for selecting a predetermined head for delivery operation, and means to actuate the head.

7. In a money handling machine, the combination of money holders each adapted to support a pile of bills, a delivery suction head for each holder normally resting upon the uppermost bill of the pile, and mechanism comprising manually controlled selecting means to move one or more of said heads into a delivery position.

8. In a money handling machine, the combination of a money holder adapted to support a pile of bills, a delivery suction head normally engaging the uppermost bill of the pile, manual means to move said head into a delivery position, and means for releasing the bill from the head at a predetermined point in the delivery movement of the latter.

9. In a money handling machine, the combination of a plurality of bill holders, suction devices associated therewith and each comprising a suction head movable toward and from the holder, manual means for selecting a predetermined head for delivery operation, means to actuate the head to deliver a piece of money from the machine, and means for simultaneously cutting off the suction from the several heads to release money from one or more of them, previously operated for delivery purposes.

10. In a money handling machine, the combination of a plurality of bill holders, suction devices associated therewith and each comprising a suction head movable toward and from the holder, manual means for selecting a predetermined head for delivery operation, means to actuate the head to deliver a piece of money from the machine, and means for automatically cutting off the suction from the several heads to release money from one or more of them, previously operated for delivery purposes.

11. In a money handling machine, the combination of a plurality of bill holders, suction devices associated therewith and each comprising a suction head movable toward and from the holder, manual means for selecting a predetermined head for delivery operation, means to actuate the head to deliver a piece of money from the machine, and means for simultaneously and automatically cutting off the suction from the several heads to release money from one or more of them, previously operated for delivery purposes.

12. In a money delivering machine, delivery mechanism comprising a plurality of suction heads each adapted to engage and carry a piece of money to a point of delivery, means for rendering selected heads operative, a main suction conduit, branch suction conduits connecting the main conduit with the several heads, means for moving the heads for delivery purposes, and means for cutting off the suction in the main conduit to release the money from any operated suction head or heads.

13. Delivering mechanism for money handling machines comprising a suction head adapted to rest on a pile of bills, means for moving the head to separate a bill from the pile, and a device including spring means to thereafter impart a delivering movement to the head.

14. Delivering mechanism for money handling machines comprising a suction head adapted to rest against a pile of bills, means to move said head to separate the uppermost bill from the pile, and means to impart a swinging movement to the head after it is moved as aforesaid, and means to render said head inoperative.

15. Delivering mechanism for money handling machines comprising suction heads each adapted to rest on a pile of bills, means to raise one or more of said heads to separate the uppermost bill from the pile, means to impart a swinging movement to each head after it is raised, a suction conduit connected with the head, and means for cutting off the suction in said conduit after the head has reached a predetermined point in its movement.

16. Delivering mechanism for money handling machines comprising a suction head, a lifting bar to elevate said head initially, a pivotal connection between the lifting bar and the head, and a device including a yielding element for imparting movement to the head other than that imparted by the lifting bar.

17. In a money delivering machine, the combination of a rock shaft, a lever loosely mounted thereon, a suction head operable by said lever, means for creating a suction through said head, a holder for bills associated with the head, means for operatively connecting and disconnecting said lever with respect to the shaft to move therewith or remain inactive, respectively, and means for actuating the shaft.

18. In a money delivering machine, the combination of a holder for bills, a suction head normally engaging the uppermost bill in the holder, a lever, a shaft upon which the lever is loosely mounted, an operative connection between the lever and the suction head, means for actuating the shaft, and manually controlled means for connecting the lever with the shaft at will.

19. In a money handling machine, the combination of a plurality of money holders, suction devices comprising heads normally engaging the outermost pieces of money in said holders, operating mechanism for said heads comprising a rock shaft, levers loosely mounted on said shaft, operative connections between the levers and the suction heads, selector mechanism to connect the levers for rocking movement with the shaft, and means for operating the shaft.

20. In a money handling machine, the combination of money holders to receive bills in piles or stacks, suction devices comprising suction heads normally engaging the outermost bill of each holder, a rock shaft, means for operating said shaft, levers associated with the shaft but normally inoperative in relation thereto, selector mechanism comprising manipulative devices, tripping arms operable by said manipulative devices to connect the levers with the rock shaft, and a suction conduit connected with the suction heads.

21. In a money handling machine, the combination of a money holder, a suction head associated therewith, a shaft, an actuating lever associated with the shaft for operation thereby, a lifting bar connecting the lever and the suction head and having a suction passage therethrough, a main suction conduit, and a flexible branch suction conduit connecting the main conduit with the lifting bar and permitting movement of the latter, and means for operating the shaft to impart corresponding movement to the lifting bar and suction head.

22. In a money handling machine, the combination of a money holder, a second money holder, means for delivering money from said holders, and means for changing the normal position of the money in one holder to prevent delivery of such money while money from the other holder is being delivered.

23. In a money handling machine, the combination of coin holders, bill holders, a plurality of ejectors for the coin holders, a plurality of pneumatic delivery devices for the bill holders, certain corresponding ejectors and delivery devices being so arranged as to deliver money of like denominations but different form, means to render one only of said corresponding ejectors and delivery devices operative at a time, and means to actuate said ejectors and delivery devices.

24. In a money handling machine, the combination of coin holders, bill holders, a main ejector shaft, coin ejecting mechanism operable by said shaft, an auxiliary ejecting shaft, bill ejecting mechanism operable by the last mentioned shaft, selective mechanism for predetermining the action of the coin and bill ejecting mechanism, and means for operating the main shaft alone or simultaneously with the auxiliary shaft.

25. In a money handling machine, the combination of coin holders, bill holders, a main ejector shaft, coin ejecting mechanism operable by said shaft, an auxiliary ejecting shaft, bill ejecting mechanism operable by the last mentioned shaft, selective mechanism for predetermining the action of the coin and bill ejecting mechanism, means for operating the main and auxiliary ejector shafts, and means for connecting and disconnecting said main and auxiliary shafts for simultaneous and separate operation, respectively.

26. In a money handling machine, the combination of coin holders, bill holders, a main ejector shaft, coin ejecting mechanism operable by said shaft, an auxiliary ejecting shaft, bill ejecting mechanism operable by the last mentioned shaft, selective mechanism for predetermining the action of the coin and bill ejecting mechanism, means for operating the main and auxiliary ejector shafts, means for connecting and disconnecting said main and auxiliary shafts for controlling simultaneous and separate operation thereof, and means for rendering the coin ejecting mechanism inoperative to eject coins when the main and auxiliary ejector shafts are connected together.

27. In a money handling machine, the combination of a plurality of bill holders, a plurality of suction devices associated therewith and adapted to carry bills from said holders to a suitable point of delivery, selector mechanism for rendering one or more of the suction devices operative, and means for individually or collectively actuating selected suction devices.

28. In a money handling machine, the combination of coin holders, bill holders, independent mechanism for delivering money from each type of holders, means for controlling delivery of coins or bills interchangeably when operating said delivery mechanisms, and means to lift coins in their holders when the bill delivery mechanism is actuated.

29. In a money handling machine, the combination of money holders adapted to contain bills disposed flat one against another in piles of different denominations, and selectively operable means to separate a bill from the piles in said holders for delivery purposes.

30. In a money handling machine, the combination of money holders adapted to contain bills disposed flat one against another in piles of different denominations, and selectively operable pneumatic devices to separate a bill from the piles in said holders and adapted to deliver the said bill.

31. In a money handling machine, the combination of money holders, pneumatic means to remove a piece of money from said holders for delivery purposes, and means to cause preliminary relative movement of said pneumatic means and the holders to separate a bill from others in the holder and to then cause a subsequent relative movement for delivery of the bill to a suitable point.

32. In a money handling machine, the combination of holders for bills of paper currency, a plurality of suction devices one for each holder for separating a bill from a pile received by the holder, and means for selectively causing relative movement of a predetermined one or more of said suction devices and holders to effect separation of a bill from the pile of a certain holder or holders.

33. In a money handling machine, the combination of a plurality of holders adapted to support monetary bills of different denominations in piles with the bills of each pile one flat against the other, a delivery device for each of said holders, a receiver common to all said delivery devices, and means to operate said delivery devices singly or collectively to deliver bills making up a predetermined amount of money to the said receiver as a common delivery point for all the delivery devices.

In testimony whereof I affix my signature in presence of two witnesses.

WILLIAM S. OVERLIN.

Witnesses:
J. F. ROBB,
H. C. ROBB.